(12) United States Patent
Ionescu

(10) Patent No.: US 6,304,403 B1
(45) Date of Patent: Oct. 16, 2001

(54) MULTIPLE DEVICES SELECTED FAULT FEATURE FOR DATA INTEGRITY IN DISC DRIVE APPLICATIONS

(75) Inventor: Stefan A. Ionescu, Burnsville, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/345,890

(22) Filed: Jul. 1, 1999

Related U.S. Application Data

(60) Provisional application No. 60/100,140, filed on Sep. 14, 1998.

(51) Int. Cl.⁷ .................................................. G11B 5/02
(52) U.S. Cl. ............................... 360/67; 360/61; 360/63; 360/31; 714/820
(58) Field of Search ................................. 360/61, 63, 31, 360/67–68; 714/820

(56) References Cited

U.S. PATENT DOCUMENTS

| | | | |
|---|---|---|---|
| 5,050,169 | * 9/1991 | Monett | 714/719 |
| 5,087,884 | 2/1992 | Brannon | 324/523 |
| 5,132,852 | 7/1992 | Price, Jr. | 360/46 |
| 5,257,146 | 10/1993 | Price, Jr. et al. | 360/67 |
| 5,287,231 | 2/1994 | Shier et al. | 360/68 |
| 5,291,347 | 3/1994 | Ngo et al. | 360/68 |
| 5,430,584 | * 7/1995 | Petersen | 360/78.04 |
| 5,488,518 | 1/1996 | Shier | 360/67 |
| 5,726,821 | 3/1998 | Cloke et al. | 360/67 |
| 6,118,602 | * 9/2000 | De La Soujeole | 360/46 |

FOREIGN PATENT DOCUMENTS 08138219  5/1996 (JP).

* cited by examiner

Primary Examiner—David Hudspeth
Assistant Examiner—Dan I. Davidson
(74) Attorney, Agent, or Firm—Jonathan E. Olson; Derek J. Berger; Shawn B. Dempster

(57) ABSTRACT

A read/write preamplifier circuit is provided that includes a fault detecting circuit that detects when two or more read/write preamplifiers are concurrently selected for communicating with their associated data heads and means for notifying the drive controller of that condition. In one embodiment of the invention, the means for notifying the drive controller that two or more preamplifiers are concurrently selected includes a data storage register that is readable by the drive controller and that has a fault flag which is set when two or more preamplifiers are concurrently selected. Also, in one embodiment, the fault detecting circuit includes a fault-detect transistor that drives a predetermined current if the preamplifier is elected. The collectors of the fault-detect transistors of each preamplifier are electronically coupled to each other and to a sensing circuit that senses if the fault-detect transistors of two or more preamplifiers are concurrently driving the predetermined current. In addition, a disc drive which includes such a preamplifier circuit is provided.

16 Claims, 3 Drawing Sheets

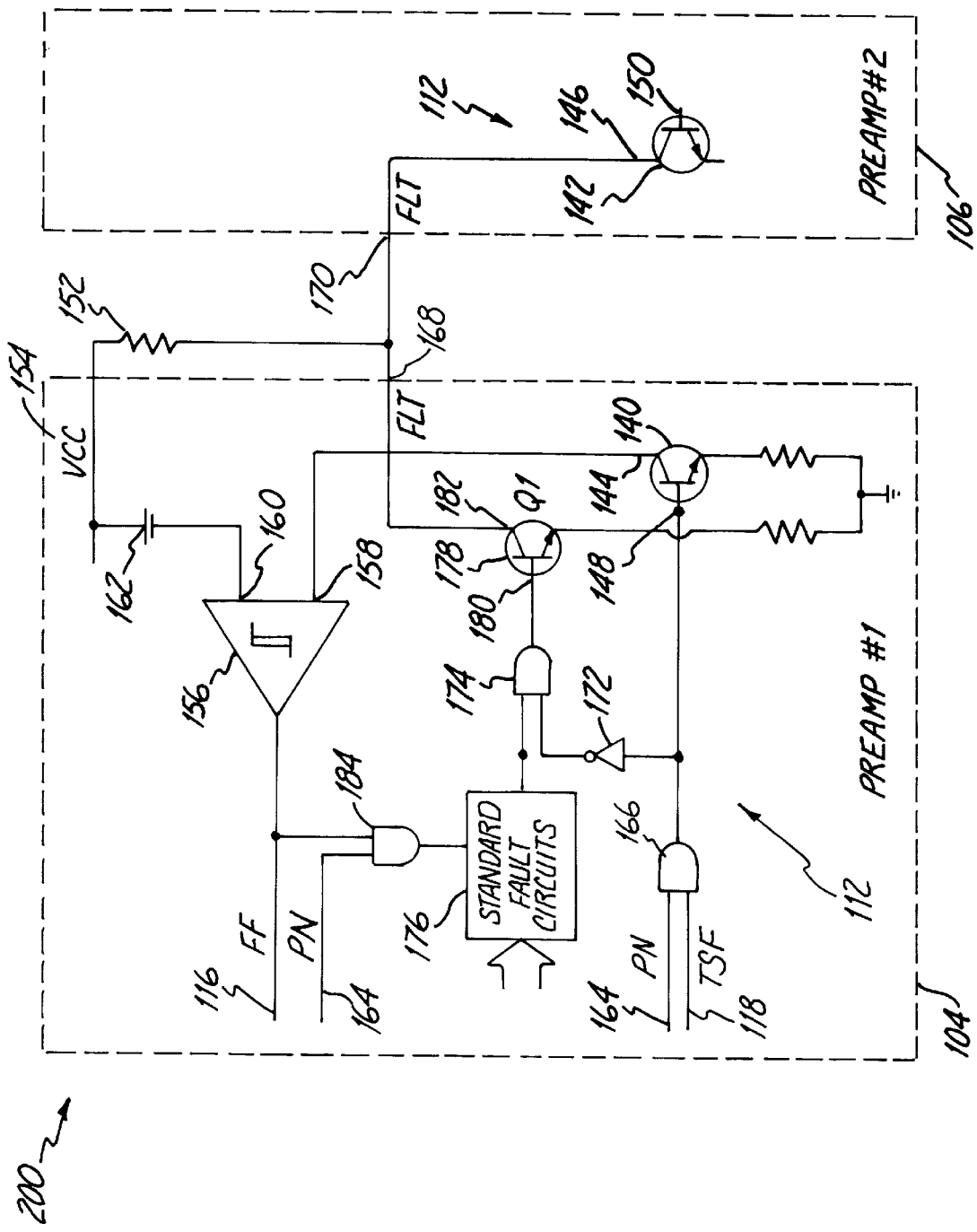

MULTIPLE DEVICES SELECTED FAULT FEATURE FOR DATA INTEGRITY IN DISC DRIVE APPLICATIONS

CROSS-REFERENCE TO CO-PENDING APPLICATION

This application claims the benefit of U.S. Provisional Patent Application No. 60/100,140, entitled "MULTIPLE DEVICES SELECTED FAULT FEATURE FOR DATA INTEGRITY IN DISC DRIVE APPLICATIONS," filed on Sep. 14, 1998.

FIELD OF THE INVENTION

The present invention relates generally to disc drive data storage systems. More particularly, the present invention relates to circuits for detecting and signaling if multiple preamplifiers are concurrently selected.

BACKGROUND OF THE INVENTION

In disc drives, digital data is written to and read from the surfaces of one or more discs. Read and write operations are performed through a transducer which is typically carried on a slider body. The slider and the transducer are sometimes collectively referred to as a data head, and typically a single data head is associated with each data storage surface. The communication to and from the data heads is performed by a read/write preamplifier. High storage-capacity disc drives typically have a large number of data heads and thus have multiple read/write preamplifiers. Each read/write preamplifier typically drives a plurality of individual data heads, usually on a multiplexed basis. Typical read/write preamplifiers have a variety of fault detectors which monitor the operation of the preamplifier and send a fault signal to the drive controller if a fault condition occurs.

In a typical disc drive, an actuator operates in a servo system. The actuator moves the data head radially over the disc surface for track seek operations and holds the transducer directly over a track on the disc surface for track following operations. A servo controller samples the position of the data heads relative to some reference point and generates an error signal based upon the difference between the actual position and the reference position. This error signal is then used to drive the data head to the desired reference point. In one type of servo system, each track on a disc includes servo position information in a block of data referred to as a header. As the trend in the disc drive industry is to increase the efficiency of storing the user's data, the so-called "headerless" track formats are being considered. These formats allow more of the disc space to be used for the user's data, as opposed to servo and track information. However, these headerless track formats raise additional difficulties for guaranteeing data integrity, as the header formerly served to ensure that data was being written to the intended track.

The present invention provides a means of improving data integrity and offers other advantages over the prior art.

SUMMARY OF THE INVENTION

The present invention relates to read/write preamplifier circuits which reduce the probability of data being written to the wrong location on a disc.

One embodiment of the present invention is directed to a read/write preamplifier circuit that includes multiple read/write preamplifiers. Each read/write preamplifier includes a fault detecting circuit that detects when two or more of the read/write preamplifiers are concurrently selected for communicating with their associated data heads. At least one of the read/write preamplifiers includes a notifier that notifies the drive controller that two or more of the read/write preamplifiers are concurrently selected.

In one embodiment of the present invention, the notifier includes a data storage register that the drive controller can read. The data storage register includes a fault flag which is set when the fault detecting circuit detects that two or more of the read/write preamplifiers are concurrently selected for communicating with their associated data heads.

In one embodiment of the present invention, the fault detecting circuit includes a fault-detect transistor and a sensing circuit coupled to the collector of the fault-detect transistor. The fault-detect transistor drives a predetermined current when a predetermined voltage is applied to the base of the fault-detect transistor. The base of the fault-detect transistor is coupled to a signal which applies the predetermined voltage to the base if the associated read/write preamplifier is selected. The collectors of the fault-detect transistors of each of the read/write preamplifiers are electronically coupled to each other. The sensing circuit senses if the fault-detect transistors of two or more read/write preamplifiers are concurrently driving the predetermined current.

Another embodiment of the present invention is directed to a disc drive that includes at least one disc, multiple data heads, a drive controller and multiple read/write preamplifiers. The data heads transfer data to and from the discs. The read/write preamplifiers communicate with the drive controller and with at least one data head. Each read/write preamplifier includes a fault detecting circuit and a data storage register that the drive controller can read. The fault detecting circuit detects when two or more of the read/write preamplifiers are concurrently selected for communicating with their associated data heads. The data storage register includes a fault flag which is set when the fault detecting circuit detects that two or more of the read/write preamplifiers are concurrently selected for communicating with their associated data heads.

In one embodiment of a disc drive according to the present invention, the data storage register further includes a test-select flag and the hard-wired address of the read/write preamplifier. The test-select flag must be set in order to enable the fault detecting circuit. Clearing the test-select flag disables the fault detecting circuit. Additionally, the data storage register is adapted to store the address of the data head that is selected. The drive controller provides the address of the selected data head to the data storage register when the data head is selected.

Still another embodiment of the present invention is directed to a disc drive that includes a drive controller, multiple read/write preamplifiers and means for determining if two or more read/write preamplifiers are concurrently selected and for notifying the drive controller when two or more read/write preamplifiers are concurrently selected.

These and various other features as well as advantages which characterize the present invention will be apparent upon reading of the following detailed description and review of the associated drawings.

BRIEF DESCRIPTION OF THE DRAWINGS

FIG. 4 is a schematic illustration of a fault detecting circuit in accordance with an illustrative embodiment of the present invention.

DETAILED DESCRIPTION OF ILLUSTRATIVE EMBODIMENTS

Figure 1:
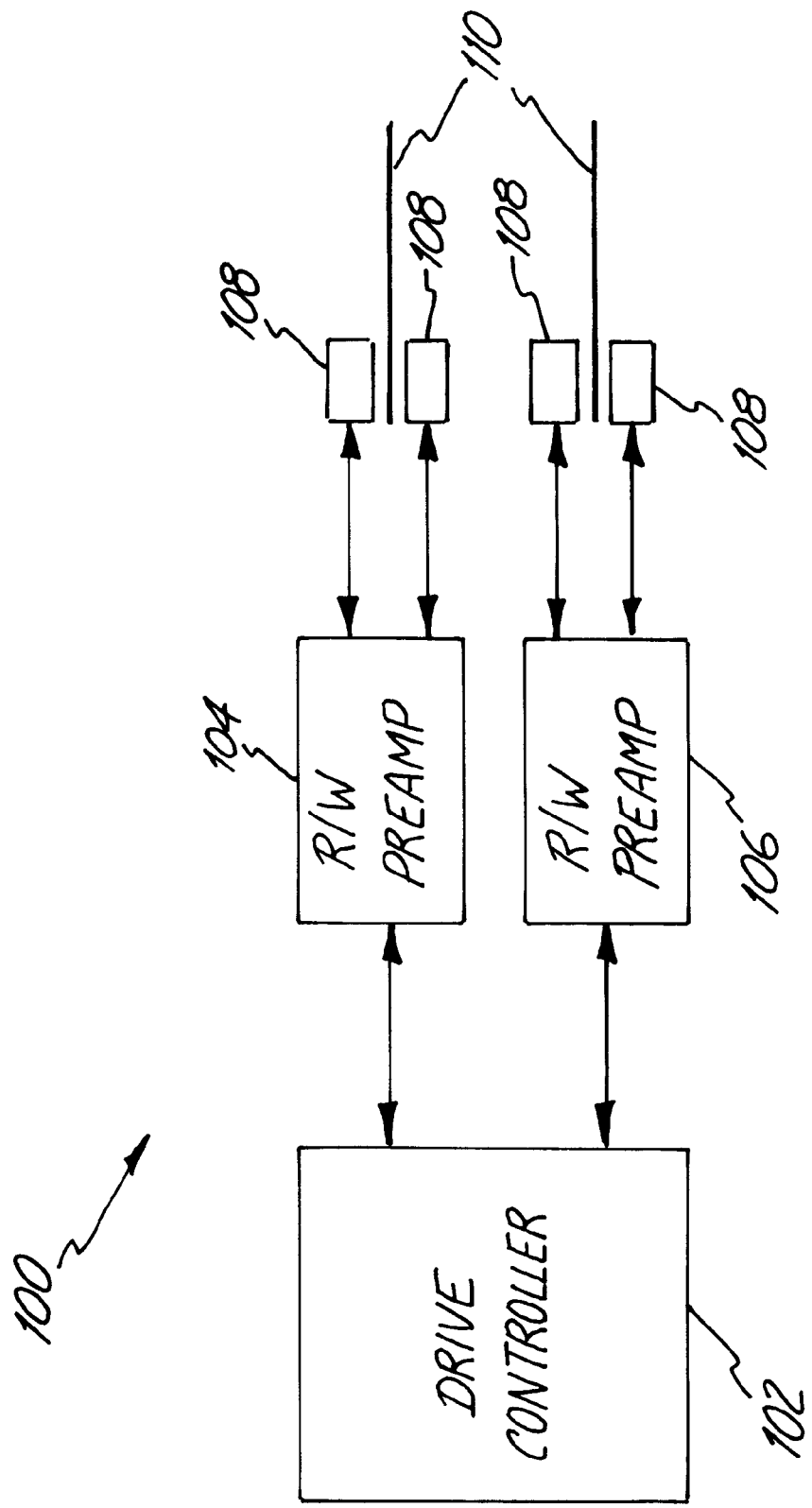
FIG. 1 is a simplified block diagram of a disc drive in accordance with an illustrative embodiment of the present invention.

FIG. 1 is a simplified block diagram of a disc drive 100 in accordance with an illustrative embodiment of the present invention. Disc drive 100 includes drive controller 102, read/write preamplifiers 104 and 106, data heads 108 and data storage discs 110. Drive controller 102 is illustratively a microprocessor or digital computer, and is coupled to a host system or another drive controller which controls a plurality of drives. Drive controller 102 communicates with multiple read/write preamplifiers 104 and 106. Each preamplifier 104 and 106 communicates with at least one data head 108. Each data head 108 illustratively includes an air bearing, or slider, which supports a transducer for reading information from and encoding information to an associated surface of one of discs 110. In accordance with the present invention, drive controller 102 may communicate with any plural number of read/write preamplifiers and each preamplifier may communicate with any number of data heads 108. For simplicity's sake, the embodiment used herein to illustrate the invention has two read/write preamplifiers 104 and 106, each of which communicate with two data heads 108.

During operation, drive controller 102 receives instructions for one or more of data heads 108 to read from or write to a surface of one or more of discs 110. Drive controller 102 then provides a signal to whichever preamplifier, 104 or 106 or both, is associated with the selected data head(s) 108. Said signal indicates which data head 108 is to be accessed and whether a read or write operation is to be performed. If a read operation is requested, the selected data head 108 generates a read signal containing data which was encoded on the surface of the disc 110. The read signal is provided to associated preamplifier 104 or 106, which amplifies the read signal and provides it to drive controller 102. If a write operation is requested, drive controller 102 provides the data to be written to the appropriate preamplifier 104 or 106, which in turn provides the data to the selected data head 108. The selected data head 108 then writes the data to its associated disc 110. In an illustrative embodiment, during normal operation only one data head 108, and therefor one preamplifier 104 or 106, is selected for reading or writing at any given time, although in certain situations, two or more preamplifiers 104,106 may be simultaneously selected.

Figure 2:
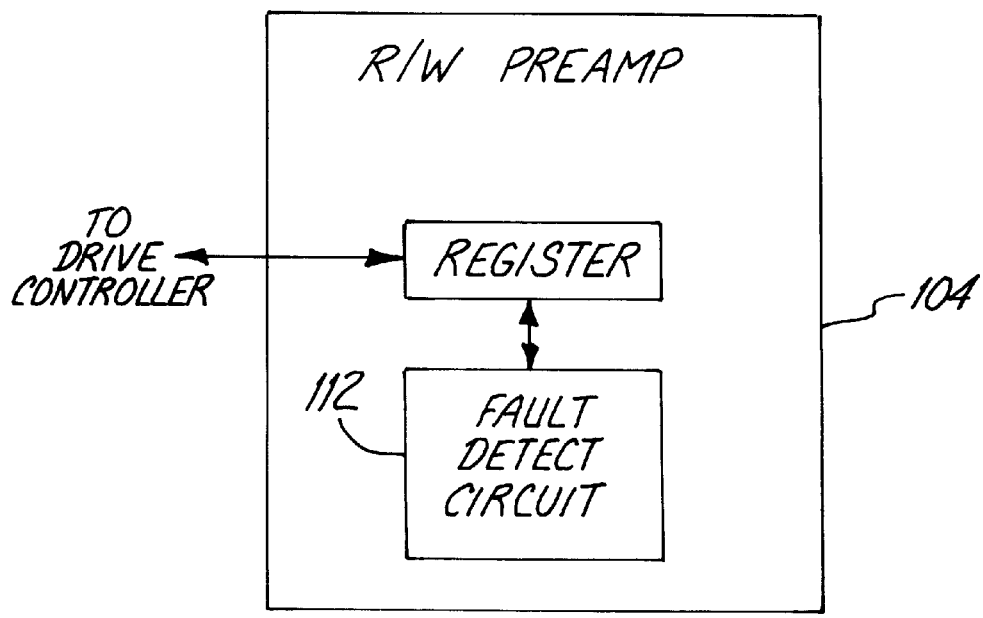
FIG. 2 is a simplified block diagram of a read/write preamplifier in accordance with an illustrative embodiment of the present invention.

FIG. 2 is a simplified block diagram of a read/write preamplifier 104 in accordance with an illustrative embodiment of the present invention. For clarity's sake, only one preamplifier is shown in FIG. 2. However, in an illustrative embodiment, each of the read/write preamplifiers 104, 106 in the disc drive 100 are configured as shown in FIG. 2. Furthermore, as mentioned above with respect to FIG. 1, disc drive 100 may include any plural number of read/write preamplifiers. Read/write preamplifier 104 includes a fault detecting circuit 112 which detects if two or more read/write preamplifiers in the disc drive 100 are concurrently selected for reading or writing. Because only one data head 108, and therefor one preamplifier 104 or 106, is selected for reading or writing at any given time during normal operation of the disc drive 100, the concurrent selection of two or more preamplifiers constitutes an error condition which could result in inadvertently overwriting user data that is stored on a disc 110. Read/write preamplifier 104 also includes a data storage register 114 which is used to store information that is indicative of whether the currently selected data head 108 is the data head that was requested. Data storage register 114 communicates with fault detecting circuit 112. Data storage register also communicates with drive controller 102 and notifies the drive controller 102 if two or more of the read/write preamplifiers 104, 106 are concurrently selected for reading or writing.

Figure 3:
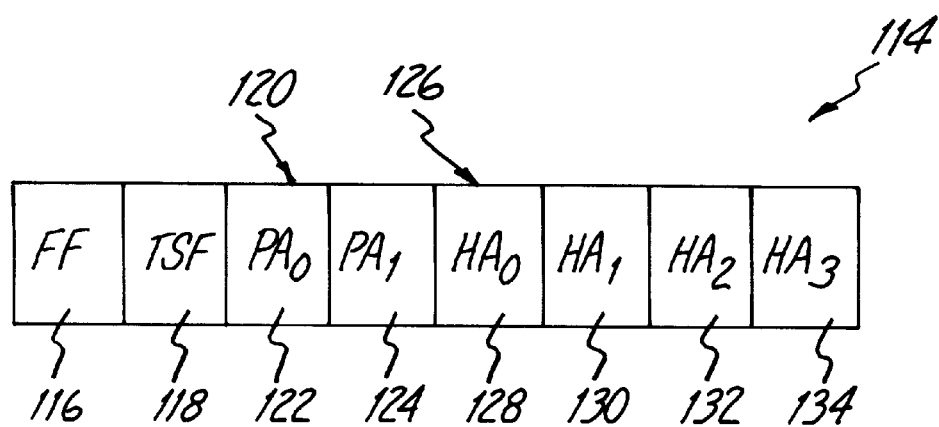
FIG. 3 is a block diagram of a data storage register in accordance with an illustrative embodiment of the present invention.

The configuration of data storage register 114 according to an illustrative embodiment of the present invention is shown in FIG. 3. The register 114 includes a fault flag (FF) 116 which is set when the fault detecting circuit 112 detects that two or more preamplifiers are concurrently selected. In an illustrative embodiment, register 114 also includes a test-select flag (TSF) 118 which must be set in order to enable the fault detecting circuit 112. Similarly, clearing the test-select flag 118 disables the fault detecting circuit 112. The test-select flag 118 of a particular preamplifier is set each time the drive controller 102 selects that preamplifier for communicating with an associated data head 110. In an illustrative embodiment, data storage register 114 also stores the hard-wired preamplifier address (PA) 120 of its associated preamplifier. In the illustrative embodiment shown in FIG. 3, the preamplifier address 120 includes two bits 122 and 124 ($PA_0$ and $PA_1$). Thus, this illustrative embodiment can accommodate up to four preamplifiers. In an illustrative embodiment, data storage register 114 also includes a number of bits that are reserved for the head address (HA) 126 of the selected data head 108. In the illustrative embodiment shown in FIG. 3, the head address 126 includes four bits 128, 130, 132 and 134 ($HA_0$, $HA_1$, $HA_2$ and $HA_3$). Thus, this illustrative embodiment can accommodate up to 16 data heads 108. It should be noted that more than four preamplifiers and more than 16 data heads can be accommodated by simply allotting more bits to the preamplifier address 120 and head address 126.

In operation, when the drive controller 102 selects a given data head 108 and its associated read/write preamplifier for reading from or writing to a disc 110, the test-select flag 118 is set and the address of the selected data head 108 is written into the data storage register at location HA 126. Setting test-select flag 118 enables fault detecting circuit 112, which determines if any other read/write preamplifiers are simultaneously selected. If fault detecting circuit 112 detects that another preamplifier is simultaneously selected, fault flag 116 is set. During the seek towards the location of the disc 110 that is to be written to or read from, drive controller 102 reads the contents of data storage register 114. This gives the drive controller 102 the feedback to determine if the targeted data head 108 is indeed the one which was enabled, and if more than one preamplifier responded to the command issued, before the read or write operation is performed.

FIG. 4 is a schematic illustration of a read/write preamplifier circuit 200 in accordance with an illustrative embodiment of the present invention. Each preamplifier 104 and 106 includes a fault detecting circuit 112. For clarity's sake, only a portion of the fault detecting circuit 112 of preamplifier 106 is shown. The remainder of the fault detecting circuit 112 of preamplifier 106 is illustratively equivalent to the fault detecting circuit 112 shown with respect to preamplifier 104. Each fault detecting circuit 112 includes a fault-detect transistor 140, 142. Each fault-detect transistor 140, 142 drives a predetermined current when a predetermined voltage is applied to the base 148, 150 of that transistor. The base 148, 150 of each transistor 140, 142 is coupled to a signal which applies the predetermined voltage to the base if the associated preamplifier 140, 142 is selected. The collector 144 of fault-detect transistor 140 is electronically coupled to the collector 146 of fault-detect transistor 142. In FIG. 4, the fault-detect transistor 142 is the only element of the fault detecting circuit 112 of preamplifier 106 that is shown.

The collectors 144 and 146 of fault-detect transistors 140 and 142 are electronically coupled to a sensing circuit which senses if the fault-detect transistors of two or more preamplifiers are concurrently driving the predetermined current. An illustrative embodiment of the sensing circuit is shown in FIG. 4. A resistor 152 of known resistance R is connected between collectors 144 and 146 and a power supply (Vcc) 154 of a known voltage. Collectors 144 and 146 are also coupled to one of the inputs 158 of voltage comparator 156. The other input 160 of voltage comparator 156 is coupled to a known threshold voltage. In the illustrative embodiment of FIG. 4, the threshold voltage is set by a voltage source 162 connected in series between the comparator 156 and the power supply 154. The output voltage of the voltage comparator 156 is substantially equal to a predetermined value if the collector voltage is less than the threshold voltage.

In an illustrative embodiment, test-select flag 118 is coupled to the base 148 of fault-detect transistor 140 such that the test-select flag 118 must be set in order for fault-detect transistor 140 to drive the predetermined current. Similarly, if the test-select flag 118 is cleared, the fault-detect transistor 140 drives substantially no current. In an illustrative embodiment, each preamplifier 104, 106 receives a signal 164 from the drive controller 102 indicating if a given data transfer operation with more than one preamplifier is to be a parallel operation. This signal 164 is coupled to the base 148, 150 of the fault-detect transistor 140, 142 such that the fault-detect transistor 140, 142 drives substantially no current if the signal 164 indicates that a parallel data transfer operation is to be performed. This feature prevents the fault detecting circuit 112 from reporting a fault condition when two or more preamplifiers are concurrently selected if a parallel data transfer operation was intended. In the illustrative embodiment of FIG. 4, signal 164 is implemented as a "parallel-not" (PN) signal which is high when a parallel operation is not being requested and which goes low when a parallel operation is requested. Test-select flag 118 and the parallel-not signal 164 are applied to AND gate 166, the output of which is applied to the gate 148 of the fault-detect transistor 140. Thus, fault-detect transistor 140 will be turned on and therefor drive a predetermined current when the test-select flag 118 is set and a parallel operation is not requested.

Standard read/write preamplifiers include fault circuits for detecting various fault conditions in the preamplifier. Typically, the output of the standard fault circuits is applied to the base of a fault driver transistor whose collector is tied to a fault pin on the preamplifier. The fault pin communicates with the drive controller and notifies the drive controller if a fault condition is detected. In an illustrative embodiment of the present invention, the collector 144, 146 of the fault-detect transistor 140, 142 of each preamplifier 104, 106 is electronically coupled to the fault pin (FLT) 168, 170 of the corresponding preamplifier 104, 106. The fault pins 168 and 170 of each of the preamplifiers 104 and 106 are electronically coupled to each other. In the illustrative embodiment shown in FIG. 4, resistor 152 is connected between the fault pin 168 and power supply 154, outside of the body of the preamplifier 104. However, it is also contemplated that resistor 152 may be connected between the collector 144 of fault-detect transistor 140 and a connection to power supply 154, within the body of the preamplifier 104.

In an illustrative embodiment of the present invention, each of the read/write preamplifiers 104, 106 include standard fault circuits 176 for detecting various fault conditions in the preamplifier 104, 106. The output of the standard fault circuits 176 is applied to the base 180 of standard fault driver transistor 178 whose collector 182 is tied to fault pin 168. The fault pin 168 is coupled to the drive controller 102 and notifies the drive controller 102 if a fault condition is detected. The output of the standard fault circuits 176 is disabled when the fault-detect transistor 140 is active. In the illustrative embodiment shown in FIG. 4, this is accomplished by inverting the signal applied to the base 148 of fault-detect transistor 140 using inverter 172. This inverted signal is applied to one of the inputs of AND gate 174. The output of the standard fault circuits 176 is applied to the other input of AND gate 174. The output of AND gate 174 is applied to the base 180 of the standard fault driver transistor 178. Therefor, standard fault driver transistor 178 is only active if the standard fault circuits 176 puts out a fault signal and fault-detect transistor 140 is inactive.

In an illustrative embodiment, the output of comparator 156 is coupled to the fault flag 116 of data storage register 114. The output of the comparator 156 sets the fault flag 116 if the voltage of the collector 144 of fault-detect transistor 140 is less than the threshold voltage. Fault flag 116 communicates with the drive controller 102. If fault flag 116 is set, this notifies the drive controller 102 that two or more preamplifiers are concurrently selected for reading or writing.

In a further illustrative embodiment, the output of comparator 156 is provided to the standard fault circuits 176. In that case, the output of comparator 156 and the parallel-not signal 164 are applied to AND gate 184, the output of which is applied to the standard fault circuits 176, which in turn provide a fault signal to fault pin 168 which is coupled to drive controller 102.

The operation of the illustrative embodiment depicted in FIG. 4 is as follows. When test-select flag 118 is set and parallel-not signal 164 is high, the output of AND gate 166 is high. When the output of AND gate 166, which is coupled to the base 148 of fault-detect transistor 140, is high, the output of inverter 172, and therefor the output of AND gate 174, is low. Thus, fault-detect transistor 140 is turned on and standard fault driver transistor 178 is turned off. Thus a known current I is sunk via fault-detect transistor 140 from the fault pin 168. If more than one of the read/write preamplifiers 104, 106 responded to the address sent by the drive controller 102, then more than one known current I will be sunk from fault pin 168, which is tied to the fault pins 170 of the other read/write preamplifiers 106. In turn, if more than one known current is sunk from fault pin 168, the voltage drop across resistor 152, of known resistance R, will be correspondingly greater. Voltage comparator 156 compares the voltage of the fault pin 168 with the threshold voltage at input 160. The value of the threshold voltage is less than ($V_{cc}-R*I$) and greater than ($V_{cc}-2R*I$), where $V_{cc}$ is the voltage of the power supply, R is the resistance of resistor 152, and I is the current sunk through resistor 152 by one fault-detect transistor 140, 142. Thus, if the voltage at fault pin 168 is less than the threshold voltage, it is known that more than one fault-detect transistor 140, 142 is active. If voltage comparator 156 detects this condition, the comparator sets fault flag 116 of data storage register 114.

Setting fault flag 116 notifies drive controller 102 that two or more preamplifiers are concurrently selected.

In an illustrative embodiment, the output of voltage comparator 156 is processed by the standard fault circuits 176 of the read/write preamplifier 104. In this embodiment, AND gate 184 provides a fault signal to standard fault circuits 176 if comparator 156 senses that more than one read/write preamplifiers 104, 106 are selected and parallel-not signal 164 is high. The standard fault circuits 176 would in turn provide a fault signal to AND gate 174. When test-select flag 118 is cleared, fault detect transistor is turned off and AND gate 174 applies a fault signal to the standard fault driver transistor 178, which then provides a fault signal to fault pin 168.

In summary, one embodiment of the present invention is directed to a read/write preamplifier circuit 200 that includes multiple read/write preamplifiers 104, 106. Each read/write preamplifier 104, 106 includes a fault detecting circuit 112 that detects when two or more of the read/write preamplifiers 104, 106 are concurrently selected for communicating with their associated data heads 108. At least one of the read/write preamplifiers 104, 106 includes a notifier for notifying the drive controller 102 that two or more of the read/write preamplifiers 104, 106 are concurrently selected.

In one embodiment of the present invention, the notifier includes a data storage register 114 that the drive controller 102 can read. The data storage register 114 includes a fault flag 116 which is set when the fault detecting circuit 112 detects that two or more of the read/write preamplifiers 104, 106 are concurrently selected for communicating with their associated data heads 108.

In one embodiment of the present invention, the fault detecting circuit 112 includes a fault-detect transistor 140, 142 and a sensing circuit coupled to the collector 144, 146 of the fault-detect transistor 140, 142. The fault-detect transistor 140, 142 drives a predetermined current when a predetermined voltage is applied to the base 148, 150 of the fault-detect transistor 140, 142. The base 148, 150 of the fault-detect transistor 140, 142 is coupled to a signal which applies the predetermined voltage to the base 148, 150 if the associated read/write preamplifier 104, 106 is selected. The collectors 144, 146 of the fault-detect transistors 140, 142 of each of the read/write preamplifiers 104, 106 are electronically coupled to each other. The sensing circuit senses if the fault-detect transistors 140, 142 of two or more read/write preamplifiers 104, 106 are concurrently driving the predetermined current.

Another embodiment of the present invention is directed to a disc drive 100 that includes at least one disc 110, multiple data heads 108, a drive controller 102 and multiple read/write preamplifiers 104, 106. The data heads 108 transfer data to and from the discs 110. The read/write preamplifiers 104, 106 communicate with the drive controller 102 and with at least one data head 108. Each read/write preamplifier 104, 106 includes a fault detecting circuit 112 and a data storage register 114 that the drive controller 102 can read. The fault detecting circuit 112 detects when two or more of the read/write preamplifiers 104, 106 are concurrently selected for communicating with their associated data heads 108. The data storage register 114 includes a fault flag 116 which is set when the fault detecting circuit 112 detects that two or more of the read/write preamplifiers 104, 106 are concurrently selected for communicating with their associated data heads 108.

In one embodiment of a disc drive 100 according to the present invention, the data storage register 114 further includes a test-select flag 118 and the hardwired address 120 of the read/write preamplifier. The test-select flag 118 must be set in order to enable the fault detecting circuit 112. Clearing the test-select flag 118 disables the fault detecting circuit 112. Additionally, the data storage register 114 is adapted to store the address of the data head that is selected. The drive controller 102 provides the address of the selected data head to the data storage register 114 when the data head 108 is selected.

Still another embodiment of the present invention is directed to a disc drive 100 that includes a drive controller 102, multiple read/write preamplifiers 104, 106 and means for determining if two or more read/write preamplifiers 104, 106 are concurrently selected and for notifying the drive controller 102 when two or more read/write preamplifiers 104, 106 are concurrently selected Although the present invention has been described with reference to a disc drive having two read/write preamplifiers, those skilled in the art will recognize that the present invention may be practiced in a disc drive having any plural number of read/write preamplifiers.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, fewer than all, and as few as one, of the read/write preamplifiers 104, 106 can include the data storage register 114. Other modifications can also be made.

What is claimed is:

1. A read/write preamplifier circuit for a disc drive having at least one disc adapted to store data, a plurality of data heads adapted to transfer data to and from a disc, and a drive controller, the preamplifier circuit comprising:

a plurality of read/write preamplifiers, each adapted to communicate with the drive controller and with at least one data head associated therewith, at least one of the read/write preamplifiers comprising a fault detecting circuit adapted to detect whether two or more of the read/write preamplifiers are concurrently selected for communicating with their associated data heads; and a data storage register readable by the drive controller and comprising a fault flag which indicates whether the fault detecting circuit detects that two or more of the read/write preamplifiers are concurrently selected for communicating with their associated data heads.

2. The read/write preamplifier circuit of claim 1 wherein each of the read/write preamplifiers includes a data storage register readable by the drive controller and comprising a fault flag which is set when the fault detecting circuit detects that two or more of the read/write preamplifiers are concurrently selected for communicating with their associated data heads, wherein the data storage register further comprises a test-select flag which indicates whether the corresponding read/write preamplifier is selected by the drive controller for communicating with an associated data head, wherein the fault detecting circuit is enabled if and only if the test-select flag indicates that the corresponding read/write preamplifier is selected.

3. The read/write preamplifier circuit of claim 2 wherein each read/write preamplifier receives a signal from the drive controller indicating whether a given data transfer operation is to be a serial operation or a parallel operation and wherein the fault detecting circuit of a particular read/write preamplifier is disabled if said particular read/write preamplifier receives a signal from the drive controller indicating that a parallel data transfer operation is to be performed.

4. The read/write preamplifier circuit of claim 2 wherein the test-select flag of a particular read/write preamplifier is set each time the drive controller selects said particular read/write preamplifier for communicating with an associated data head.

5. The read/write preamplifier circuit of claim 2 wherein the data storage register further comprises the hard-wired address of the read/write preamplifier.

6. The read/write preamplifier circuit of claim 5 wherein the data storage register is adapted to store the address of the data head which is selected for transferring data to or from the disc, wherein the drive controller provides the address of the data head to the data storage register when the data head is selected.

7. The read/write preamplifier circuit of claim 1 wherein each of the fault detecting circuit(s) comprises:

a fault-detect transistor adapted to drive a predetermined current when a predetermined voltage is applied to the base of the fault-detect transistor, wherein the base of the fault-detect transistor is coupled to a signal which applies the predetermined voltage to the base if the associated read/write preamplifier is selected; and a sensing circuit electronically coupled to the collector of the fault-detect transistor and adapted to sense if the fault-detect transistors of two or more of the read/write preamplifiers are concurrently activated.

8. The read/write preamplifier circuit of claim 7 wherein each read/write preamplifier includes a fault pin which during normal operation of the read/write preamplifier is adapted to put out a fault signal if some fault condition exists in the read/write preamplifier, wherein the collector of the fault-detect transistor is electronically coupled to the fault pin of the corresponding read/write preamplifier and wherein the fault pins of each of the read/write preamplifiers are electronically coupled to each other.

9. The read/write preamplifier circuit of claim 8 wherein each read/write preamplifier includes a standard fault circuit adapted to detect various faults in the read/write preamplifier, wherein the fault pin of each read/write preamplifier is coupled to an output of the standard fault circuit of the corresponding read/write preamplifier and wherein the output of the standard fault circuit is disabled when the predetermined voltage is applied to the base of the fault-detect transistor.

10. The read/write preamplifier circuit of claim 7 wherein each read/write preamplifier receives a signal from the drive controller indicating whether a given data transfer operation is to be a serial operation or a parallel operation and wherein the signal is coupled to the base of the fault-detect transistor such that the fault-detect transistor drives substantially no current if the signal indicates that a parallel data transfer operation is to be performed.

11. The read/write preamplifier circuit of claim 7 wherein each read/write preamplifier is electronically coupled to a power supply of known voltage and wherein the sensing circuit of each read/write preamplifier comprises:

a resistor of known resistance connected between the collector of the fault-detect transistor and the power supply; and a voltage comparator having first and second inputs, the first input being coupled to the collector of the fault-detect transistor and the second input being coupled to a known threshold voltage, wherein the output voltage of the comparator is substantially equal to a predetermined value if the collector voltage is less than the threshold voltage.

12. The read/write preamplifier circuit of claim 11 wherein each read/write preamplifier includes a fault pin which during normal operation of the read/write preamplifier is adapted to put out a fault signal if some fault condition exists in the read/write preamplifier, wherein the collector of the fault-detect transistor is electronically coupled to the fault pin of the corresponding read/write preamplifier, wherein the fault pins of each of the read/write preamplifiers are electronically coupled to each other and wherein the resistor is connected between the fault pin and the power supply.

13. The read/write preamplifier circuit of claim 1 wherein each of the read/write preamplifiers includes a data storage register readable by the drive controller and comprising a fault flag which is set when the fault detecting circuit detects that two or more of the read/write preamplifiers are concurrently selected for communicating with their associated data heads, wherein the data storage register further comprises a test-select flag, wherein the test-select flag is coupled to the base of the fault-detect transistor such that the test-select flag must be set in order for the fault-detect transistor to drive the predetermined current and such that if the test-select flag is cleared the fault-detect transistor drives substantially no current.

14. A disc drive comprising:

at least one disc adapted to store data;

a plurality of data heads adapted to transfer data to and from the at least one disc;

a drive controller adapted to control the operation of the disc drive; and a plurality of read/write preamplifiers, each adapted to communicate with the drive controller and with at least one data head, wherein each read/write preamplifier comprises:

a fault detecting circuit adapted to detect when two or more of the read/write preamplifiers are concurrently selected for communicating with their associated data heads; and a data storage register readable by the drive controller and comprising a fault flag which is set when the fault detecting circuit detects that two or more of the read/write preamplifiers are concurrently selected for communicating with their associated data heads.

15. The disc drive of claim 14 wherein the data storage register further comprises:

a test-select flag, wherein the test-select flag must be set in order to enable the fault detecting circuit and wherein clearing the test-select flag disables the fault detecting circuit;

the hard-wired address of the read/write preamplifier; and a predetermined number of bits adapted to store the address of the data head which is selected for transferring data to or from the disc, wherein the drive controller provides the address of the selected data head to the data storage register when the data head is selected.

16. A disc drive comprising:

a drive controller;

a plurality of read/write preamplifiers, each adapted to communicate with the drive controller and with at least one disc; and means for storing a value indicative of whether two or more of the read/write preamplifiers are concurrently selected for communicating with an associated respective disc surface.

* * * * *